APPARATUS FOR UTILIZING VARIABLE LENGTH ALPHABETIZED CODES

Filed Sept. 4, 1958

INVENTORS E. N. GILBERT
E. F. MOORE
BY Alan C. Rose
ATTORNEY

INVENTORS E. N. GILBERT
E. F. MOORE
BY Alan C. Rose
ATTORNEY

FIG. 6

| LETTER | VARIABLE LENGTH CODE PREFIXED BY 1 AND SHIFTED TO THE RIGHT | | | | | | | | | TELETYPE CODE OUTPUT | | | | | OUT. TO CLEAR SHIFT REG. |
|---|---|---|---|---|---|---|---|---|---|---|---|---|---|---|---|
| | $y_1$ | $y_2$ | $y_3$ | $y_4$ | $y_5$ | $y_6$ | $y_7$ | $y_8$ | $y_9$ | $x_1$ | $x_2$ | $x_3$ | $x_4$ | $x_5$ | W |
| SPACE | 0 | 0 | 0 | 0 | 0 | 0 | 1 | 0 | 0 | 0 | 0 | 1 | 0 | 0 | 1 |
| A | 0 | 0 | 0 | 0 | 1 | 0 | 1 | 0 | 0 | 1 | 1 | 0 | 1 | 1 | 1 |
| B | 0 | 0 | 1 | 0 | 1 | 0 | 1 | 0 | 0 | 1 | 0 | 0 | 1 | 1 | 1 |
| C | 0 | 0 | 1 | 0 | 1 | 0 | 1 | 0 | 1 | 0 | 1 | 1 | 1 | 0 | 1 |
| D | 0 | 0 | 0 | 1 | 0 | 1 | 0 | 1 | 1 | 1 | 0 | 0 | 1 | 0 | 1 |
| E | 0 | 0 | 0 | 0 | 1 | 0 | 1 | 1 | 0 | 1 | 0 | 0 | 0 | 0 | 1 |
| F | 0 | 0 | 1 | 0 | 1 | 1 | 1 | 0 | 0 | 1 | 0 | 1 | 1 | 0 | 1 |
| G | 0 | 0 | 1 | 0 | 1 | 1 | 1 | 0 | 1 | 0 | 1 | 0 | 1 | 1 | 1 |
| H | 0 | 0 | 0 | 1 | 0 | 1 | 1 | 1 | 1 | 0 | 0 | 1 | 0 | 1 | 1 |
| I | 0 | 0 | 0 | 0 | 1 | 1 | 0 | 0 | 0 | 0 | 1 | 1 | 0 | 0 | 1 |
| J | 0 | 1 | 1 | 0 | 0 | 1 | 0 | 0 | 0 | 1 | 1 | 0 | 1 | 0 | 1 |
| K | 0 | 1 | 1 | 0 | 0 | 1 | 0 | 0 | 1 | 1 | 1 | 1 | 1 | 0 | 1 |
| L | 0 | 0 | 1 | 1 | 0 | 0 | 1 | 0 | 1 | 0 | 1 | 0 | 0 | 1 | 1 |
| M | 0 | 0 | 0 | 1 | 1 | 0 | 0 | 1 | 1 | 0 | 0 | 1 | 1 | 1 | 1 |
| N | 0 | 0 | 0 | 0 | 1 | 1 | 0 | 1 | 0 | 0 | 0 | 1 | 1 | 0 | 1 |
| O | 0 | 0 | 0 | 0 | 1 | 1 | 0 | 1 | 1 | 0 | 0 | 0 | 1 | 1 | 1 |
| P | 0 | 0 | 1 | 1 | 1 | 0 | 0 | 0 | 0 | 0 | 1 | 1 | 0 | 1 | 1 |
| Q | 0 | 0 | 1 | 1 | 1 | 0 | 0 | 0 | 1 | 1 | 1 | 1 | 0 | 1 | 1 |
| R | 0 | 0 | 0 | 1 | 1 | 1 | 0 | 0 | 1 | 0 | 1 | 0 | 1 | 0 | 1 |
| S | 0 | 0 | 0 | 0 | 1 | 1 | 1 | 0 | 1 | 1 | 0 | 1 | 0 | 0 | 1 |
| T | 0 | 0 | 0 | 0 | 1 | 1 | 1 | 1 | 0 | 0 | 0 | 0 | 0 | 1 | 1 |
| U | 0 | 0 | 1 | 1 | 1 | 1 | 1 | 0 | 0 | 1 | 1 | 1 | 0 | 0 | 1 |
| V | 0 | 0 | 1 | 1 | 1 | 1 | 1 | 0 | 1 | 0 | 1 | 1 | 1 | 1 | 1 |
| W | 0 | 0 | 1 | 1 | 1 | 1 | 1 | 1 | 0 | 1 | 1 | 0 | 0 | 1 | 1 |
| X | 0 | 1 | 1 | 1 | 1 | 1 | 1 | 1 | 0 | 1 | 0 | 1 | 1 | 1 | 1 |
| Y | 1 | 1 | 1 | 1 | 1 | 1 | 1 | 1 | 0 | 1 | 0 | 1 | 0 | 1 | 1 |
| Z | 1 | 1 | 1 | 1 | 1 | 1 | 1 | 1 | 1 | 0 | 0 | 0 | 0 | 1 | 1 |
| OTHER BINARY COMBINATIONS WHICH CORRESPOND TO CODES THAT ARE NOT COMPLETELY SHIFTED IN | | | | | | | | | | d | d | d | d | d | 0 |

INVENTORS E. N. GILBERT
E. F. MOORE
BY Alan C. Rose
ATTORNEY

Jan. 9, 1962 E. N. GILBERT ETAL 3,016,527

APPARATUS FOR UTILIZING VARIABLE LENGTH ALPHABETIZED CODES

Filed Sept. 4, 1958 5 Sheets-Sheet 4

FIG. 5

| | TELETYPE CODE | | | | | VARIABLE LENGTH CODE SUFFIXED BY 1 | | | | | | | | |
|---|---|---|---|---|---|---|---|---|---|---|---|---|---|---|
| | $x_1$ | $x_2$ | $x_3$ | $x_4$ | $x_5$ | $y_1$ | $y_2$ | $y_3$ | $y_4$ | $y_5$ | $y_6$ | $y_7$ | $y_8$ | $y_9$ |
| SPACE | 0 | 0 | 1 | 0 | 0 | 0 | 0 | 1 | 0 | 0 | 0 | 0 | 0 | 0 |
| A | 1 | 1 | 0 | 0 | 0 | 0 | 1 | 0 | 0 | 1 | 0 | 0 | 0 | 0 |
| B | 1 | 0 | 0 | 1 | 1 | 0 | 1 | 0 | 1 | 0 | 0 | 1 | 0 | 0 |
| C | 0 | 1 | 1 | 1 | 0 | 0 | 1 | 0 | 1 | 0 | 1 | 1 | 0 | 0 |
| D | 1 | 0 | 0 | 1 | 0 | 0 | 1 | 0 | 1 | 1 | 1 | 0 | 0 | 0 |
| E | 1 | 0 | 0 | 0 | 0 | 0 | 1 | 1 | 0 | 1 | 0 | 0 | 0 | 0 |
| F | 1 | 0 | 1 | 1 | 0 | 0 | 1 | 1 | 1 | 0 | 0 | 1 | 0 | 0 |
| G | 0 | 1 | 0 | 1 | 1 | 0 | 1 | 1 | 1 | 0 | 1 | 1 | 0 | 0 |
| H | 0 | 0 | 1 | 0 | 1 | 0 | 1 | 1 | 1 | 1 | 1 | 0 | 0 | 0 |
| I | 0 | 1 | 1 | 0 | 0 | 1 | 0 | 0 | 0 | 1 | 0 | 0 | 0 | 0 |
| J | 1 | 1 | 0 | 1 | 0 | 1 | 0 | 0 | 1 | 0 | 0 | 0 | 1 | 0 |
| K | 1 | 1 | 1 | 1 | 0 | 1 | 0 | 0 | 1 | 0 | 0 | 1 | 1 | 0 |
| L | 0 | 1 | 0 | 0 | 1 | 1 | 0 | 0 | 1 | 0 | 1 | 1 | 0 | 0 |
| M | 0 | 0 | 1 | 1 | 1 | 1 | 0 | 0 | 1 | 1 | 1 | 0 | 0 | 0 |
| N | 0 | 0 | 1 | 1 | 0 | 1 | 0 | 1 | 0 | 1 | 0 | 0 | 0 | 0 |
| O | 0 | 0 | 0 | 1 | 1 | 1 | 0 | 1 | 1 | 1 | 0 | 0 | 0 | 0 |
| P | 0 | 1 | 1 | 0 | 1 | 1 | 1 | 0 | 0 | 0 | 0 | 1 | 0 | 0 |
| Q | 1 | 1 | 1 | 0 | 1 | 1 | 1 | 0 | 0 | 0 | 1 | 1 | 0 | 0 |
| R | 0 | 1 | 0 | 1 | 0 | 1 | 1 | 0 | 0 | 1 | 1 | 0 | 0 | 0 |
| S | 1 | 0 | 1 | 0 | 0 | 1 | 1 | 0 | 1 | 1 | 0 | 0 | 0 | 0 |
| T | 0 | 0 | 0 | 0 | 1 | 1 | 1 | 1 | 0 | 1 | 0 | 0 | 0 | 0 |
| U | 1 | 1 | 1 | 0 | 0 | 1 | 1 | 1 | 1 | 0 | 0 | 1 | 0 | 0 |
| V | 0 | 1 | 1 | 1 | 1 | 1 | 1 | 1 | 1 | 0 | 1 | 1 | 0 | 0 |
| W | 1 | 1 | 0 | 0 | 1 | 1 | 1 | 1 | 1 | 1 | 0 | 1 | 0 | 0 |
| X | 1 | 0 | 1 | 1 | 1 | 1 | 1 | 1 | 1 | 1 | 1 | 0 | 1 | 0 |
| Y | 1 | 0 | 1 | 0 | 1 | 1 | 1 | 1 | 1 | 1 | 1 | 1 | 0 | 1 |
| Z | 1 | 0 | 0 | 0 | 1 | 1 | 1 | 1 | 1 | 1 | 1 | 1 | 1 | 1 |
| | ALL OTHER CODES | | | | | 0 | 0 | 1 | 0 | 0 | 0 | 0 | 0 | 0 |

INVENTORS E. N. GILBERT
E. F. MOORE
BY Alan C. Rose
ATTORNEY

INVENTORS E.N. GILBERT
E.F. MOORE
BY Alan C. Rose
ATTORNEY

United States Patent Office 3,016,527

Patented Jan. 9, 1962

3,016,527

APPARATUS FOR UTILIZING VARIABLE LENGTH ALPHABETIZED CODES

Edgar N. Gilbert, Whippany, and Edward F. Moore, Chatham, N.J., assignors to Bell Telephone Laboratories, Incorporated, New York, N.Y., a corporation of New York Filed Sept. 4, 1958, Ser. No. 759,067
4 Claims. (Cl. 340—347)

This invention relates to data processing systems employing variable length codes, and to systems employing a new type of "encoding" or set of variable length codes.

"Encodings" including a set of variable length codes are well known in the data handling art. One classical example of such an encoding is the Morse code. The average time for the transmission of information is reduced by the use of such encodings because the shorter code groups, or codes, can be used to represent the most frequently used characters. Thus, for example, in the Morse code, a dot represents the letter "E" and the sequence "dot-dash" represents an "A." More recently, it has been determined that certain variable length binary encodings are self-synchronizing. Accordingly, if the decoder at a receiving terminal initially receives an incomplete code when this type of variable length encoding is employed, it soon regains synchronism with the encoder at the transmitting terminal.

When the shortest binary codes are employed to represent the most frequently used letters of an alphabet, the codes included in the resulting encoding normally have a random numerical ordering with respect to the alphabetical ordering of the letters represented by the codes. The enciphered digital information is therefore not readily processed, as complex matrices are required even for the simplest sorting operations.

Accordingly, one object of the present invention is to simplify sorting arrangements for variable length digital code handling systems. A concomitant object of the present invention is the provision of a variable length encoding in which the numerical ordering of the codes in the encoding corresponds to the alphabetical listing of the characters represented by the codes. In addition, to retain the advantages of variable length codes, the shorter codes should, in general, represent the most frequently used characters.

In accordance with the invention, numerically ordered variable length binary encodings have been developed which are very nearly as economical as variable length encodings having codes which are not readily sorted. Thus, for example, in accordance with an encoding which will be set forth in detail below, the letters D, E, and F may be represented by the codes 01011, 0110, and 011100, respectively. Because E occurs less frequently than either D or F, it is represented by a four-digit code. Similarly, the relative frequencies of occurrence of the letters D and F dictate the five-digit length for the letter D and the six-digit length for the letter F. When the code groups are examined numerically on a digit-by-digit basis from the left-hand end of each code, however, it may be seen that the three codes have progressively increasing numerical values corresponding to their alphabetical ordering. More specifically, the first four binary digits 0101, 0110, and 0111 of the codes representing letters D, E, and F, respectively, are the binary numbers corresponding to the decimal numbers 5, 6, and 7, respectively. Numerical sorting of codes therefore produces alphabetical ordering of the enciphered letters.

Suitable enciphering and deciphering circuits have been developed for translating to and from the variable length code groups. In addition, circuitry for determining word lengths has been devised. It has also been determined, in accordance with the invention, that a standard binary number sorter will sort enciphered words into their proper alphabetical order.

In accordance with one feature of the invention, a circuit is provided for enciphering variable length, numerically ordered binary codes, and a binary number sorter is connected to receive the enciphered codes and sort them.

In accordance with an additional feature of the invention, a data processing circuit includes a source of signals representing characters having a predetermined ordering, circuitry for converting said signals into variable length codes having a numerical ordering corresponding to said predetermined ordering, and additional circuitry for numerically comparing said variable length codes.

Another feature of the invention involves the provision in the apparatus noted in the preceding paragraph of arrangements for breaking the received code groups into words, and for "normalizing" or shifting the variable length words into alignment with each other prior to the numerical comparison or sorting operation.

Other objects, features, and advantages of the invention may be readily understood from a consideration of the following detailed description and the accompanying drawing, in which:

FIG. 5 is a table indicating the correspondence between a standard Teletype code and a variable length code in accordance with the invention;

FIG. 6 is another table giving the correspondence between a variable length code and the standard Teletype code, and represents the function of the deciphering translator.

Figure 1:
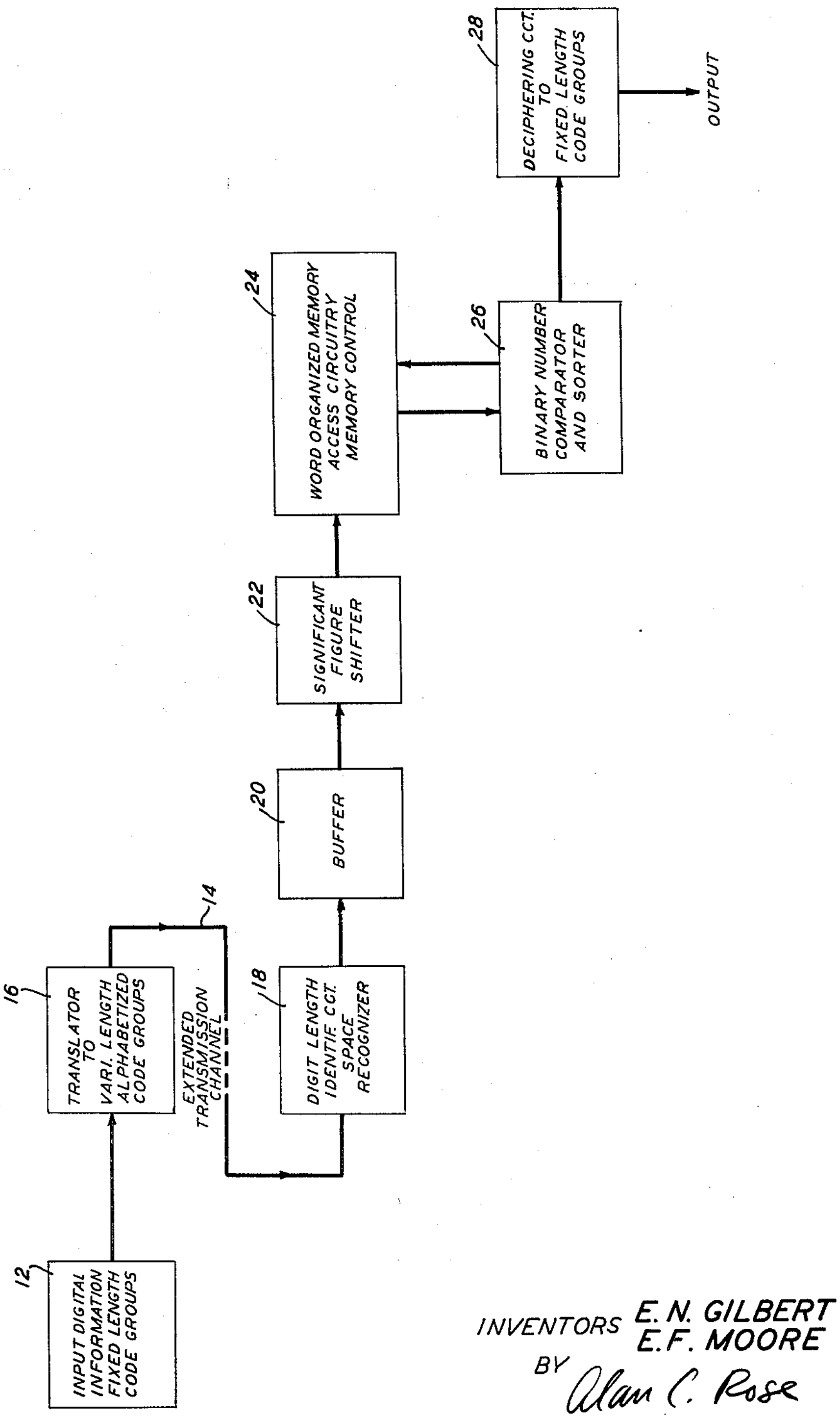
FIG. 1 is a block diagram of a data processing circuit for variable length order codes in accordance with the invention.

In the illustrative circuit of FIG. 1, the block 12 represents a source of input information. By way of specific example, in the present circuits the input information is supplied as fixed length Teletype code groups. Before application to the extended transmission facility 14, the input information from source 12 is enciphered by the translator 16. The code groups applied from translator 16 to the transmission channel 14 are variable length codes which are numerically ordered to correspond to the alphabetical progression of the original letters.

The receiver includes the digit length identification circuit 18, a buffer circuit 20, and a circuit 22 for shifting the most significant digit of the applied variable length code groups to a standard position. The groups of codes forming a word are applied to the memory circuit 24 and to the binary number comparison and sorting circuit 26. Depending on the type of number sorter which is employed, the sorting process may or may not include successive transfers between the memory circuitry 24 and the sorter 26. Following the sorting operation, the information is transmitted to the output translator 28 where the variable length codes are deciphered into standard teletype output signals.

Table I set forth below provides the background against which the following description of various types of codes and encodings will be discussed. The table indicates the probability of occurrence of various letters of our alphabet, and shows one prior art variable length code. In addition, two representative variable length codes which are numerically ordered are presented. At the bottom of the table, the "cost" in terms of average bits per character is indicated.

TABLE I

| Probability | Letter | Prior Variable Length Encoding | Alphabetical Encoding | Special Encoding |
|---|---|---|---|---|
| 0.1859 | space | 000 | 00 | 00 |
| 0.0642 | A | 0100 | 0100 | 0100 |
| 0.0127 | B | 011111 | 010100 | 010100 |
| 0.0218 | C | 11111 | 010101 | 010101 |
| 0.0317 | D | 01011 | 01011 | 01011 |
| 0.1031 | E | 101 | 0110 | 0110 |
| 0.0208 | F | 001100 | 011100 | 011100 |
| 0.0152 | G | 011101 | 011101 | 011101 |
| 0.0467 | H | 1110 | 01111 | 01111 |
| 0.0575 | I | 1000 | 1000 | 1000 |
| 0.0008 | J | 0111001110 | 1001000 | 10001111111 |
| 0.0049 | K | 01110010 | 1001001 | 100100 |
| 0.0321 | L | 01010 | 100101 | 100101 |
| 0.0198 | M | 001101 | 10011 | 10011 |
| 0.0574 | N | 1001 | 1010 | 1010 |
| 0.0632 | O | 0110 | 1011 | 1011 |
| 0.0152 | P | 011110 | 110000 | 11000 |
| 0.0008 | Q | 0111001101 | 110001 | 110001111111 |
| 0.0484 | R | 1101 | 11001 | 11001 |
| 0.0514 | S | 1100 | 1101 | 1101 |
| 0.0796 | T | 0010 | 1110 | 1110 |
| 0.0228 | U | 11110 | 111100 | 111100 |
| 0.0083 | V | 0111000 | 111101 | 111101 |
| 0.0175 | W | 001110 | 111110 | 111110 |
| 0.0013 | X | 0111001100 | 1111110 | 1111101111111 |
| 0.0164 | Y | 001111 | 11111110 | 1111110 |
| 0.0005 | Z | 0111001111 | 11111111 | 11111101111111 |
| | | Cost: 4.1195 | Cost: 4.1978 | Cost: 4.1801 |

In Table I, three different encodings are given which each represent the letters of the alphabet and the space symbol in binary form. Each is a variable length encoding; that is, the code for each letter is a sequence of binary digits, but the codes assigned to different letters do not all consist of the same number of binary digits.

The first two encodings designated the "prior variable length encoding" and the "alphabetical encoding" both have the prefix property. This signifies that no one of the codes is a prefix of any other code of the same encoding. This property makes it easy to decipher a message, since it is only necessary to look at enough binary digits of the message to see that these digits agree with one of the codes to recognize the first letter of the message. The "special encoding" of Table I does not have the prefix property. With reference to the letters "Y" and "Z" of this "special encoding," it may be observed that it is necessary to look at the entire fourteen digits representing the letter "Z" to distinguish between the codes representing these two letters.

The "prior variable length encoding" is constructed by the method given by D. A. Huffman in an article entitled "A Method for the Construction of Minimum Redundancy Codes," Proceedings of the I.R.E., volume 50, pages 1098 to 1101, September 1952. This code has the property of being a minimum redundancy encoding. This means that among all variable length binary encodings having the prefix property, this is one encoding which has the lowest average number of binary digits per letter, assuming that the message is made up of letters which are independently chosen each with the probability indicated in Table I.

The second encoding called the "alphabetical encoding" has the property that the numerical binary order of the codes corresponds to the alphabetical order of the letters. Among all such alphabetical order-preserving binary encodings which are variable in length and have the prefix property, the given one has been constructed to have the lowest possible cost, or average number of binary digits per letter. It may be seen that the cost of 4.1978 of the "alphabetical encoding" is quite close to the cost of 4.1195 of the prior art encoding. The alphabetical restriction therefore adds surprisingly little expense to a variable length encoding.

Before proceeding with a detailed consideration of the present codes and circuits, one property of many variable length encodings which is of special interest will be noted. This is their ability to automatically synchronize the deciphering circuit with the enciphering circuit. This self-synchronizing property has practical significance in that it permits the use of deciphering apparatus without including any special synchronizing circuits or synchronizing pulses such as are required for fixed length encodings. In certain cases, therefore, variable length encodings lend themselves to simpler instrumentation than fixed length encodings.

Some examples indicating the nature of the self-synchronizing properties of the variable length alphabetical code of Table I will now be set forth. In the first example, the encoding of a standard text passage such as "Now is the time . . . " will be shown as received without errors. Two additional examples will then be presented in which initial binary digits were not received by the decoding apparatus. To fully appreciate these examples, it should be noted that only the binary symbols "1" and "0" are received by the decoder; the slash marks "/" indicate the separation of complete code groups as recognized by the decoder. The designation "Sp" indicates a space between words.

*Example I*

N O W Sp I S Sp T 1 0 1 0/1 0 1 1/1 1 1 1 1 0/0 0/1 0 0 0/1 1 0 1/0 0/1 1 1 0

In Example II set forth below, two "X's" have been substituted for the first two binary digits of the code group representing the letter "N." This indicates that these digits were either included as part of an erroneous preceding code group or that the decoding apparatus is out of synchronism for some other reason. The slash following the "X's" indicates that the decoder is cleared and is prepared to receive complete code groups.

*Example II*

N Y Sp I S Sp T

X X/1 0 1 0/1 1 1 1 1 1 1 0/0 0/1 0 0 0/1 1 0 1/0 0/1 1 1 0

In Example III set forth below, only the initial digit of the code group 1010 is represented by an "X."

*Example III*

C X Sp I S Sp T

X/0 1 0 1 0 1/1 1 1 1 1 1 0/0 0/1 0 0 0/1 1 0 1/0 0/1 1 1 0

In Examples II and III set forth above, it may be seen that synchronism is regained after only about two code groups or fifteen binary digits have been received. Although this is a somewhat lower number of digits than would normally be required for recapturing synchronization, the receiver will normally become synchronized with the transmitter within a few words. It is also interesting to note that certain short sequences of letters always produce synchronism. The word "that" is such a sequence. A number of other short universal synchronizing sequencies for the alphabetical encoding of Table I are the enciphered forms of the space symbol followed by the letter "Y," and the sequences AY, BD, BY, EY, HI, ID, JO, JU, MW, NY, OW, PO, PU, and TY. When any of the foregoing sequencies occur, synchronism between transmitted and received signals is immediately regained. Other longer combinations of letters will, of course, also produce synchronization.

FIG. 1 shows an over-all block circuit diagram for utilizing the alphabetical code of Table I. In general, the low average number of bits per letter is useful in reducing the channel space on the extend transmission channel 14. Suitable sorting equipment 26 makes use of the numerical ordering of the variable length alphabetized encoding. In accordance with our invention, the sorter 26 sorts enciphered code groups into alphabetical order by a conventional numerical sorting process. This may be accomplished in view of the previous translation into numerically order codes and the normalization of the code groups by the significant figure shifting circuit 22.

Figure 2:
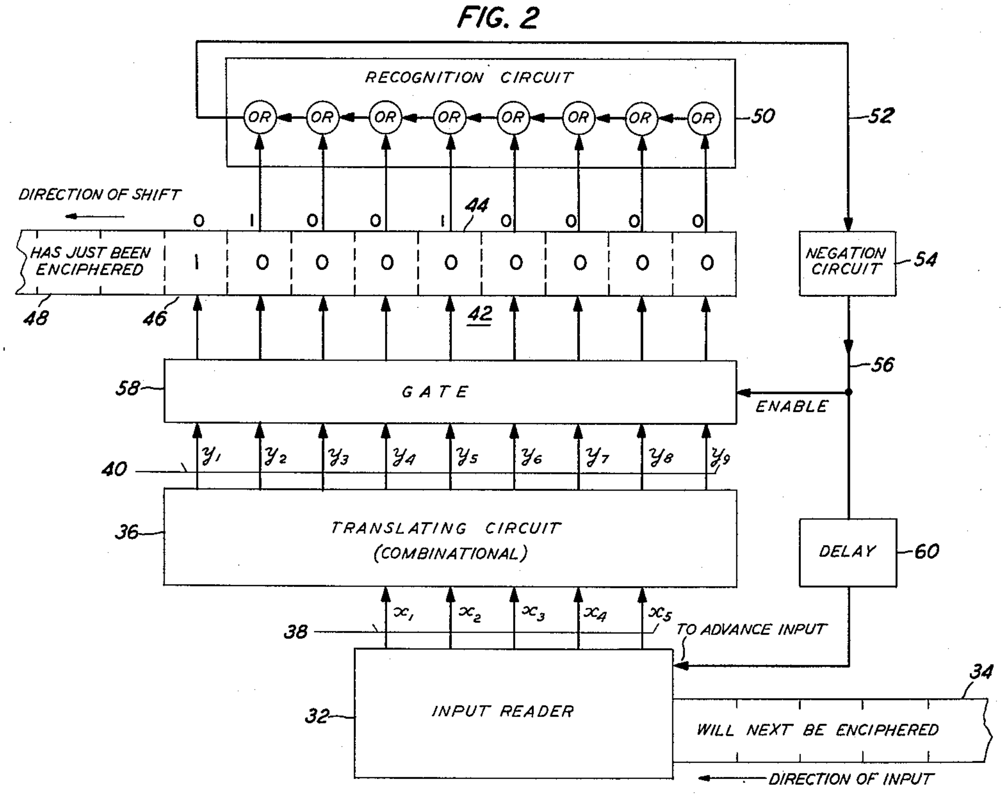
FIG. 2 is an enciphering circuit which may be employed with the circuit of FIG. 1.

In the following portion of the description, arrangements for implementing the block diagram of FIG. 1 will be set forth. In FIG. 2, standard Teletype signals are applied to the input reader 32. The input tape 34 may, for example, be perforated with five-digit codes, such as those listed in the left-hand binary encoding shown in FIG. 5. The translating circuit 36 of FIG. 2 converts the standard Teletype signals which appear on leads 38 into the alphabetical code as shown in FIG. 5, and applies the resultant binary signals to leads 40. The codes are always applied to the output stages of the shift register 42 of FIG. 2. In addition, a marker pulse is added to the end of each code group as it is inserted in the shift register 42. In the table of FIG. 5, the variable length code groups suffixed by a "1" are shown associated with the corresponding Teletype code. To point up the variable length of the codes which are employed, the codes together with the marker bits employed at the transmitter and receiver are printed boldly in FIGS. 5 and 6. Only the codes themselves, exclusive of the marker bits, are transmitted to the receiver.

The circuit of FIG. 2 is arranged with input signals arriving at the lower right-hand and output signals being transmitted from the shift register 42 at the upper left-hand portion of the figure. This arrangement, which is contrary to the usual left-to-right flow employed in circuit diagrams, is used to facilitate a comparison of the table of FIG. 5 with FIG. 2. Thus, for example, Table I indicates that the code representing the letter "A" is 0100. With reference to the table of FIG. 5, it may be seen that the code to be inserted in shift register 42 includes the following nine digits, 010010000. These binary digits have been added to FIG. 2 immediately above the shift register stages in which they would be inserted. It may be noted that the four digits 0100 appear in the four output stages of the shift register 42. In addition, they are followed immediately by the marker pulse in the shift register stage 44 of the shift register 42. The remaining stages of the shift register are filled in with "0's."

As mentioned above, each of the codes of the alphabetical encoding shown in Table I appears at the output of the translating circuit 36 of FIG. 2 suffixed by a "1," as indicated in the table of FIG. 5. The final stage of the shift register 42 forming part of the enciphering circuit is designated 46. In FIG. 2, the state of shift register 42 is indicated as including a single "1" in shift register stage 46, and "0's" in the remaining stages. This corresponds to the shift position in which a code has just been transmitted to the output circuit 48 in FIG. 2, and in which the extra marker bit is still in the output stage 46 of the shift register 42. This condition is recognized by the logic circuit 50. This logic circuit 50 includes a series of OR gates connected to every stage of the shift register except the output stage 46. When the marker bit which follows each code is in the main portion of shift register 42 to the right of output stage 46, a signal is applied through the OR circuits included in logic circuit 50, and appears on lead 52. When all of the stages of shift register 42 except the output stage 46 are in the "0" state, lead 52 is de-energized. During this shift interval, the negation circuit 54 produces a control pulse on lead 56. The control signal on lead 56 enables the gate circuit 58, and a new code is inserted into shift register 42.

Concurrently with the application of a new code to shift register 42, the output marker bit in shift register stage 46 is cleared. The signals applied to the output circuit 48 therefore include only the original codes as set forth in the alphabetical encoding of Table I, and do not include the marker bit.

Following a brief delay provided by circuit 60, the control pulse from lead 56 is applied to advance the input reader 32. The delay 60 is provided to permit transfer of the signals on leads 40 to shift register 42 before a new code is applied on leads 38 to the translating circuit 36.

Figure 3:
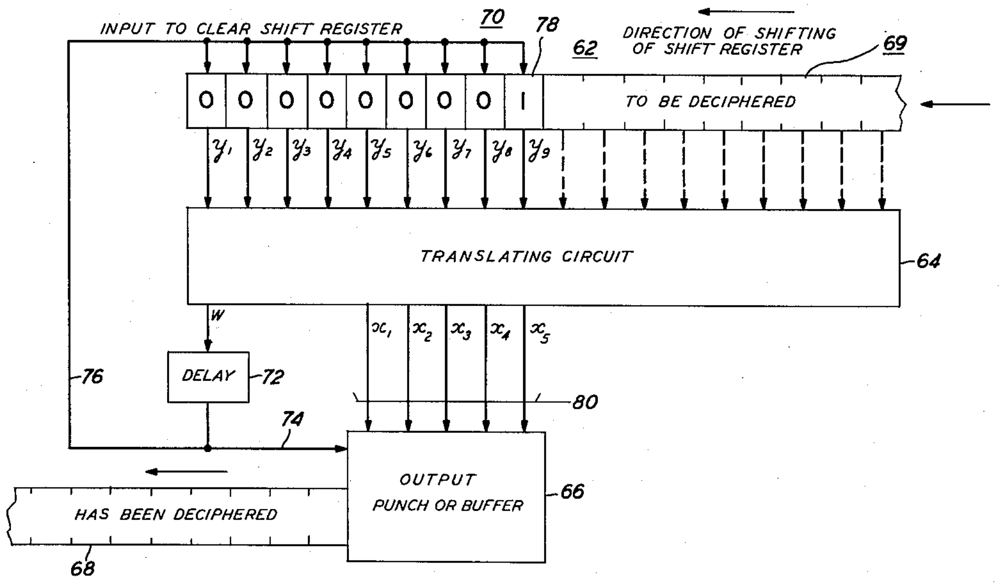
FIG. 3 represents a deciphering circuit.

The deciphering circuit of FIG. 3 corresponds to the block 28 of FIG. 1. The deciphering circuit includes the shift register 62, the decoding translator 64, and the output punch or buffer 66, which transmits signals to the Teletype output tape 68. The shift register 62 includes a portion 69 to which variable length codes are initially applied, and a principal portion 70 from which received codes are recognized. When the decoding translator 64 recognizes a code which is shifted into the portion 70 of the shift register 62, an output signal is applied through the delay circuit 72 to the control leads 74 and 76.

The signal applied to the clearing control lead 76 resets the principal portion 70 of the shift register 62 to the state shown in FIG. 3. More specifically, the portion 70 is reset to the state in which all of the stages except input stage 78 are in the binary "0" state. A marker pulse is inserted as a binary "1" in the initial input stage 78 of the portion 70. The "truth table" of FIG. 6 indicates the relationship between the signals present in the shift register and the output signals on leads 80 intercoupling the decoding translator 64 and the output punch 66. The need for the marker pulse in the deciphering circuit may be readily appreciated by noting the confusion which could otherwise occur in the interpretation of the various transmitted code groups.

The output punch or buffer circuit 66 is enabled by signals on lead 74. The delay provided by circuit 72 is sufficient for the registration of control signals from leads 80 in the output circuit 66. Accordingly, when the enabling signal arrives on lead 74, the proper teletype signal is punched into the output tape 68.

Figure 4:
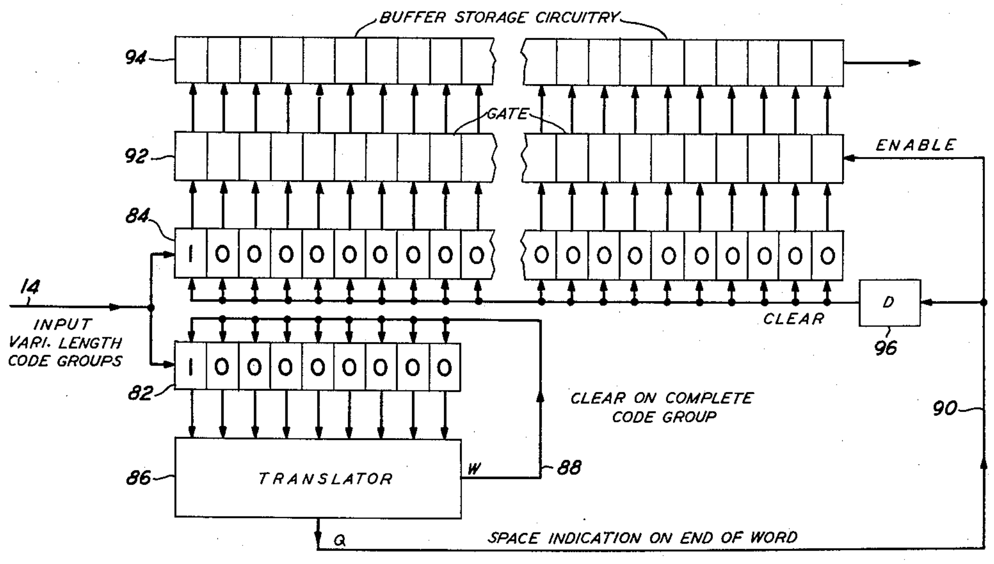
FIG. 4 is a detailed block diagram of certain additional components of the system of FIG. 1.

The circuit of FIG. 4 corresponds generally to the blocks designated 18 and 20 in FIG. 1. It is designed to break the enciphered message from channel 14 down into words including the words or groups of codes which are included between the codes representing a space. Input code groups from the channel 14 are applied in parallel to the shift registers 82 and 84. The shift register 82 has nine stages and is generally equivalent in its function to the shift register portion 70 forming part of shift register 62 in FIG. 3. The shift register 84 is long enough to hold a complete word or group of codes. The translator 86 coupled to the shift register 82 is a simplified version of the translating circuit 64 of FIG. 3. The only outputs required from translator 86 are the signal "W" on lead 88 indicating a complete code group and the signal "Q" on lead 90 indicating a space character and the end of a word. Following the completion of each code group, the shift register 82 is cleared to the indicated state by a signal on lead 88. The signals in shift register 84 are progressively advanced until the occurrence of a space indication signal on lead 90. When a pulse is applied to lead 90, the gating circuit 92 is enabled, and the contents of shift register 84 are transferred to the buffer storage circuitry 94. Following a brief delay provided by circuit 96, the shift register 84 is cleared to the indicated state preparatory to receiving additional signals from channel 14.

The buffer storage circuitry 94 may include one or more shift registers or other known temporary storage arrangements. Signals may be transferred from these shift registers serially to the significant figure shifting or normalizing circuit 22 shown in FIG. 1. With the marker pulse located in the position shown in FIG. 4, words of variable length which are applied to the buffer storage circuit 94 may be readily shifted to a standard position in which the marker bit is the most significant digit. "0's" are then filled in at the end of the words to form standard length binary words. The standard length words may then be handled conveniently by a word organized memory 24, of the type disclosed, for example, by R. L. Best in "Memory Units in the Lincoln TX-2," Proceedings of the Western Joint Computer Conference, pages 160-167, February 26-28, 1957, and a conventional binary number sorter 26 as shown in FIG. 1. By way of specific example, the sorter disclosed in E. F. Moore application Serial No. 688,355, filed October 4, 1957, now Pat. No. 2,983,904, may be employed.

Various additional ramifications of the circuits of FIGS. 2, 3, and 4 merit brief consideration. Thus, for example, in the enciphering circuit of FIG. 2, each stage of the shift register 42 except the final output stage 46 is shown connected to an OR circuit included in the logic circuit 50. For the alphabetical encoding of Table I, only five connections from the five shift register stages closest to output stage 46 are required. The need for five connections is determined by the code group 110000 representing the letter "P." Because this code group includes four consecutive "0's," connections must be made from five shift register stages to the logic circuit 50 to determine the shift register interval in which the marker bit is shifted to the output stage 46.

As mentioned above, the alphabetical encoding of Table I has the property that no code group is the prefix for any other code group. In the variable length code group of Table I designated the "special encoding," some codes may be the prefix for other codes, and the individual codes may still be uniquely decipherable. For example, it may be noted that the code 1111110 for the letter "Y" is the prefix for the code 11111101111111 representing the letter "Z." If an encoding of this type is employed, the additional shift register stages shown in portion 69 of register 62 and the connections to the translator 64 shown in dashed lines are required. By checking the signals on these additional leads, it may be determined whether or not a given code group entered in the main portion of shift register 62 is merely the prefix to another code group. Similar changes in the shift register 82 and translator 86 of FIG. 4 would be required if an encoding which does not have the prefix property is employed.

Concerning the instrumentation of the circuitry shown in FIGS. 1 through 4, the shift registers and logic circuits are of a conventional nature. Suitable AND, OR, and shift register circuits are shown, for example, in a book entitled "High-Speed Computing Devices" by Engineering Research Associates, McGraw-Hill Book Company, Inc., 1950. Other suitable logic circuits are disclosed in an article entitled "Regenerative Amplifier for Digital Computer Applications" by J. H. Felker, which appeared on pages 1584 through 1596 of the November 1952 issue of the Proceedings of the I.R.E. (volume 40, No. 11). The gate circuit 58 may be formed of a series of AND gates each having one input connected to one of the leads 40 and the other input enabled by signals from lead 56.

As mentioned above, no separate synchronization signals need be transmitted to the decoder to indicate the end of a code group. However, synchronization signals corresponding to the arrival of successive binary digits are developed at the receiver by conventional techniques. These signals are employed to control the shift registers, for example, and are employed in combination with code group and word completion signals W and Q to develop timing control signals for the remainder of the circuitry at the receiver terminal.

The encoding translator 36 of FIG. 2 and the decoding translator 64 of FIG. 3 may be devised by a person skilled in the design of logic circuits from the tables of FIGS. 5 and 6. However, for completeness, the Boolean algebraic equations for the necessary circuits are set forth below. Initially, the following Boolean algebraic equations represent the translation circuit 36 of FIG. 2. The equations are in terms of the five input signals $x_1$ through $x_5$ and the nine output signals $y_1$ through $y_9$ which appear on leads 38 and 40, respectively, in FIG. 2.

$$y_1=x_2x'_3x_4x'_5+x'_1x'_2x_3x_4+x'_1x'_2x'_3x_5+x_1x'_2x_3x_5+x_1x_3x'_4+x_1x_5x'_4+x_2x_3x'_4+x_2x_5x'_4+x_1x_2x_3x'_5+x'_1x_3x_4x_5 \quad (1)$$

$$y_2=x_1x'_4+x'_1x_2x_4+x_1x'_2+x_3x'_4x_5+x'_2x'_4x_5 \quad (2)$$

$$y_3=x'_2x'_4x_5+x'_1x_2x'_3x'_4x'_5+x'_1x'_2x_3x'_5+x'_1x'_2x'_3x_4+x_2x_4x_5+x_1x'_2x_3x_4+x_1x'_2x'_3x'_4+x_1x_2x_3x'_4x'_5 \quad (3)$$

$$y_4=x'_1x_2x_3x_4+x_1x_3x'_5+x_1x_4x'_5+x_2x'_3x'_4x_5+x_1x'_2x_5+x_3x'_2x_5+x'_1x_4x_5 \quad (4)$$

$$y_5=x_3x'_2x_5+x_1x'_3x'_4+x'_1x'_2x_5+x_1x'_2x'_3x_4x'_5+x_1x'_2x'_4+x'_1x_2x_3x'_4x'_5+x'_1x_2x'_3x_4x'_5+x'_1x'_2x_3x_4 \quad (5)$$

$$y_6=x'_1x_2x_4+x_3x'_2x_5+x_1x'_2x'_3x_4x'_5+x'_1x_2x'_3x_5+x_1x_3x'_4x_5+x_1x'_2x'_4x_5 \quad (6)$$

$$y_7=x_1x_2x_3x'_5+x'_1x_2x_3x_4+x'_1x_2x_5+x_1x'_4x_5+x_1x'_2x'_3x_5+x_1x_3x_4x'_5 \quad (7)$$

$$y_8=x_1x_2x_4x'_5+x_1x'_2x_3x_4x_5+x_1x'_2x'_3x'_4x_5 \quad (8)$$

$$y_9=x_1x'_2x_4x_5 \quad (9)$$

Figure 7:
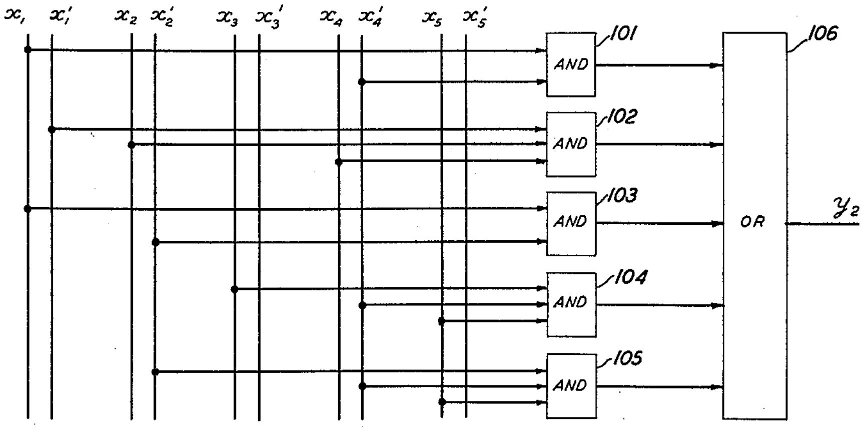
FIG. 7 is a representative logic circuit included in one of the translators.

The circuit of FIG. 7 is provided to indicate the correspondence between logic circuits and Boolean algebraic equations. More specifically, the circuit of FIG. 7 is a realization of Boolean algebraic Equation 2 set forth above. Considering Equation 2, it may be recalled that the symbols $x_1$ through $x_5$ represent the successive digits of the input Teletype code which appears on leads 38. The primed symbols $x'_1$ through $x'_5$ are negated values of the signals $x_1$ through $x_5$, respectively. Thus, for example, if $x_2$ is "0" for a particular code, $x'_2$ would be a binary "1."

The rules for transforming Boolean algebraic equations into logic circuits are quite simple. First, binary variables which are shown in Boolean algebraic equations as being multiplied together form the inputs to AND circuits. Secondly, terms which are to be added together in accordance with Boolean algebraic equations form the inputs to OR circuits. The circuit of FIG. 7 is derived from Equation 2 by following these two rules. Thus, for example, the five AND circuits 101 through 105 correspond to the five terms of Equation 2. The outputs from the AND circuits 101 through 105 are applied to the OR circuit 106 as required by the summing of these terms in the Boolean algebraic Equation 2. The remaining Equations 1 and 2 through 9, giving values for the binary variables $y_1$ and $y_3$ through $y_9$, respectively, may be implemented in much the same manner as described above in connection with Equation 2 above and FIG. 7.

The implementation of the translator 36 of FIG. 2 has been discussed in the preceding paragraphs. In a similar manner, the translation circuit 64 of FIG. 3 performs the conversion shown in tabular form in FIG. 6. In addition, the following Boolean algebraic equations represent one possible implementation of the decoding translation circuit 64. In the table of FIG. 6 and in the following equations, the symbols $y_1$ through $y_9$ represent the output signals from shift register 70 and the symbols $x_1$ through $x_5$ represent the teletype signals which appear on leads 80. The symbol W is the code recognition signal, and indicates that a complete code is registered in shift register 70 forming part of the over-all shift register 62. Similarly, the symbol Q indicates the space siginal, and the end of a word.

$$x_1=y_1+y_2+y_3y_8+y_5y_7y'_8y'_9+y_4y'_7y_9+y'_5y'_7+y'_4y'_6y_8+y'_3y'_4y_7y_9 \quad (10)$$

$$x_2=y_6y'_7y'_8+y_3y_4+y_3y_9+y'_3y_5y'_8y'_9 \quad (11)$$

$$x_3=y_1y'_9+y_2y_8+y_2y_9+y_5y'_6y_9+y_3y_4y_5y'_8+y'_5y_7y_8+y'_4y'_5y_7+y'_4y_7y_9+y'_2y'_7y'_9 \quad (12)$$

$$x_4=y_2+y_3y'_4+y'_7y_8+y_4y_6y'_8y_9 \quad (13)$$

$$x_5=y_3y_4y_9+y_3y'_6y'_9+y_3y_6y_9+y'_4y_8y_9+y_6y_7y_8 \quad (14)$$

$$W=y_1+y_4y_5y_9+y_2y'_4+y_2y'_9+y_5y'_7y_8y_9+y_3y_5y'_8+y_3y_8y'_9+y_4y'_8y_9+y'_4y'_6y'_8y'_9+y'_4y_5y'_7y_9+y'_4y_5y_8y'_9+y_6y_7y'_8y_9 \quad (15)$$

$$Q=y'_1y'_2y'_3y'_4y'_5y'_6y_7y'_8y'_9 \quad (16)$$

The foregoing equations complete the definitive specification for the circuits shown in the drawing. Consideration of certain more general matters relating to variable length alphabetical encodings will now be undertaken.

Initially, it is interesting to consider the concept of entropy as applied to the transmission of information in the form of binary signals. The term "cost" will be employed to indicate the average number of binary digits per character of a given encoding. By way of example, the 26 letters and the space symbol of our alphabet can clearly be represented by five binary digits, which include $2^5$ or 32 combinations. The cost of such an encoding is therefore equal to five bits per letter. Similarly, with reference to Table I, the "prior variable length encoding" has a cost of 4.1195, the "alphabetical encoding" has a cost of 4.1978, and the "special encoding" has a cost of 4.1801 binary digits per letter.

Mr. Claude E. Shannon discovered that English text has an entropy of about one bit per letter. That is, when a sentence is picked at random from an English text, on the average it takes only two guesses to recognize the next letter in a moderately long sequence. This fact was discovered by a series of tests on representative English texts.

As applied to the present problem, it may be seen that the entropy of approximately one bit per letter of English text is far less than the cost of slightly more than four bits per letter required by the encodings set forth in Table I. By employing combinations of letters, or words, as the letters of a much longer alphabet, however, the cost of a given encoding may be made arbitrarily close to the entropy of approximately one bit per letter of English text. With more random input signals the entropy is, of course, much higher. As a practical matter, some improvement may be obtained by employing "letters" to represent some of the more common groups of letters such as TH, ER, and so forth. However, the expense of providing increasingly complex terminal facilities as larger groups of letters are employed soon exceeds the savings realized by decreasing the number of bits per letter in the transmitted message. It is to be understood, however, that the principles of the present invenion are applicable to variable length alphabetized encodings in which a single code is employed to represent several letters, for example.

The problem of providing a best alphabetical encoding such as that shown in Table I will now be considered. The raw materials for developing a best alphabetical encoding are (1) the required ordering of the letters to be included, and (2) the probability of occurrence of each letter. A rigorous mathematical technique for developing the best encoding will be set forth below. By means of certain techniques, or tricks, however, the problem of developing a best alphabetical encoding may be progressively simplified until the solution may be determined in certain instances by inspection. Many of the techniques for simplifying the problem make use of the low probability of occurrence of some of the letters. In a sense, the simplification may be considered to be a combining of a number of letters having relatively low probability, and representing them by a single "letter" having the combined probability of occurrence of the original letters. In more formal terms, a broad aspect of the foregoing proposition may be expressed as the following theorem.

THEOREM I

Let C(L) denote the code for letter L in a best alphabetical encoding. Suppose a prefix set is known, say the one with prefix $\pi$. Construct a shorter alphabet by replacing all letters of the prefix set by a single new letter $L^1$, letting $L^1$ occupy the place of the prefix set in the alphabetical order. Consider a new encoding problem for the new alphabet in which the letter probabilities are unchanged except that Prob ($L^1$) is the sum of the probabilities of the letters which were in the prefix set. A best encoding of the new alphabet gives L the code C(L) if L was not in the prefix set and gives $L^1$ the code $\pi$.

As used in the foregoing paragraph, a "prefix set" is a group of all codes which have the same given binary prefix. Thus, for example, in the alphabetical encoding of Table I, the letters I and J constitute a prefix set, and they also form a part of a larger prefix set including all of the letters I through Z, as these are all the letters which start with a binary "1."

Another theorem which is helpful in developing a best alphabetical encoding is the following.

THEOREM II

Every best alphabetical encoding is exhaustive.

Regarding the use of the term "exhaustive," an encoding will be said to be exhaustive if it encodes an alphabet of two or more letters in a uniquely decipherable manner, and for every infinite sequence of binary digits there is some message which can be enciphered to correspond identically to this infinite sequence.

The next two theorems are of a relatively subordinate nature and are set forth below.

THEOREM III

Let $\pi$ be a prefix. In a best alphabetical encoding if there is a code with the prefix $\pi 0$ there is one with the prefix $\pi 1$. Conversely, if there is a code with prefix $\pi 1$, there is one with prefix $\pi 0$.

The validity of Theorem III can be recognized from a consideration of the case in which one code has the prefix $\pi 0$, and there is no code with the prefix $\pi 1$. Under these circumstances, the code with the prefix $\pi 0$ could be shortened by the elimination of the "0" from the prefix without introducing any ambiguity.

THEOREM IV

Let $L_a$ be the letter of lowest probability. In a best alphabetical encoding, $L_a$ together with one of $L_{a+1}$ or $L_{a-1}$ must form a prefix set. Here $L_1, L_2 \ldots$ are the letters arranged alphabetically, i.e., $L_{a+1}$ is the letter following $L_a$ in alphabetical order.

Thus, for example, if Z is the letter of lowest probability, we know Y and Z must be in a prefix set. The problem of forming a best alphabet may therefore be reduced in accordance with Theorem I set forth above.

A more general statement of the principles included in the subordinate Theorems III and IV is set forth in the following Theorem V.

THEOREM V

Let $L_a$ be the letter of lowest probability and let $p_i$ denote the probability of $L_i$. Suppose that $$p_a+1>p_a+p_{a-1}$$

Then $L_a$ and $L_{a-1}$ must form a prefix set in any best alphabetical encoding. Similarly, if $p_{a-1}>p_a+p_{a+1}$, $L_a$ and $L_{a+1}$ must form a prefix set.

The remaining theorems which will be considered are as follows.

THEOREM VI

If $L_i$ and $L_j (i<j)$ are two letters both of probability exceeding $p_{i+1}+p_{i+2} \ldots + \ldots + p_{j-1}$, then the intervening letters $L_{i+1}, L_{i+2}, \ldots, L_{j-1}$ form a prefix set in any best alphabetical encoding.

THEOREM VII

If $p_1<p_3$, then $L_1$ and $L_2$ form a prefix set in any best alphabetical encoding. Similarly, if $L_n$ is the last letter of the alphabet $L_{n-1}$ and $L_n$ must form a prefix set if $p_n<p_{n-2}$.

The significance of Theorem VII set forth above may be seen by reference to letters X and Y in Table I. In this regard it may be noted that the probability of the occurrence of the latter Y is considerably greater than that of the letter X. This is reflected in the "Prior variable length encoding" by the greater length of the code for the letter X than for the letter Y. Theorem VII, however, as applied to the probabilities of letters X, Y, and Z, requires that the letter Y have a length which is equal to or greater than the letter X.

Through the use of the theorems set forth above, the problem of forming a best alphabetical encoding for the 27 letter alphabet shown in Table I with the probabilities indicated in that table can be simplified by the combinations summarized in the following Table II.

TABLE II

| Letter: | Code |
|---|---|
| B | $\pi$(B, C)0. |
| C | $\pi$(B, C)1. |
| F | $\pi$(F, G)0. |
| G | $\pi$(F, G)1. |
| J | $\pi$(J, K, L)00. |
| K | $\pi$(J, K, L)01. |
| L | $\pi$(J, K, L)1. |
| P | $\pi$(P, Q)0. |
| Q | $\pi$(P, Q)1. |
| U | $\pi$(U, . . . Z)00. |
| V | $\pi$(U, . . Z)01. |
| W | $\pi$(U, . . Z)10. |
| X | $\pi$(U, . . Z)110. |
| Y | $\pi$(U, . . . Z)1110. |
| Z | $\pi$(U, . . Z)1111. |

The unknown prefixes $\pi$(B, C), . . . are to be determined by finding a best alphabetical encoding of the 17 letter alphabet listed in Table III below.

TABLE III

| Probability | Letter | Number Digits |
|---|---|---|
| .1859 | space | 2 |
| .0642 | A | 4 |
| .0345 | L (B, C) | 5 |
| .0317 | D | 5 |
| .1031 | E | 4 |
| .0360 | L (F, G) | 5 |
| .0467 | H | 5 |
| .0575 | I | 4 |
| .0378 | L (J, K, L) | 5 |
| .0198 | M | 5 |
| .0574 | N | 4 |
| .0632 | O | 4 |
| .0160 | L (P, Q) | 5 |
| .0484 | R | 5 |
| .0514 | S | 4 |
| .0796 | T | 4 |
| .0668 | L (U, . . . Z) | 4 |

With this simplification of the problem of finding a best alphabetical encoding, it was not difficult to complete the codes as indicated in Table I under the alphabetical encoding. The method of approach to this problem will now be considered in some detail.

In some special situations, the best alphabetical encoding costs no more (in digits per letter) than a best encoding obtained without requiring the alphabetical property. For example, the alphabet ($\alpha$, $\beta$, $\gamma$, $\delta$, $\epsilon$, $\zeta$) with the probabilities listed in Table IV has a best encoding obtained by Huffman's method as shown in Table IV.

TABLE IV

| Letter | Probability | Best Encoding | Best Alphabetical Encoding |
|---|---|---|---|
| $\alpha$ | .125 | 110 | 000 |
| $\beta$ | .0626 | 1110 | 0010 |
| $\gamma$ | .0624 | 1111 | 0011 |
| $\delta$ | .24 | 10 | 01 |
| $\epsilon$ | .26 | 00 | 10 |
| $\zeta$ | .25 | 01 | 11 |

If we try to write down codes in numerical order using the same numbers of digits as in the best encoding we obtain, in this case, another encoding which has the same cost and which is alphabetical, this is a best alphabetical encoding.

A similar computation may be tried on the alphabet of Table III. In this case, there is no alphabetical encoding which uses the same code lengths as the best encoding. The difficulty arises because M and L(P, Q) are much less probable than their neighbors and hence have much longer codes than their neighbors in a best encoding. However, using Theorem IV, first on L(P, Q) and then on M, it follows that L(P, Q) must form a prefix set with one of O or R and M must form a prefix set with one of L(J, K, L) or N. Trying these simplifications produces four possibilities and best encodings may be computed for each one. The one with the smallest cost is the one in which J, K, L, M and P, Q, R are made into new letters. The best encoding uses codes having the numbers of digits shown in Table III. It is now possible to find an alphabetical encoding which has the same code lengths and which is therefore best.

Consideration will now be given to a general alphabetizing algorithm. This technique may be employed to solve the complete alphabetizing problem or may be utilized in solving a simplified problem such as that indicated by Table III.

The method which will be used in general builds up the best alphabetical encoding for the entire alphabet by first making best alphabetical encodings for certain subalphabets. In particular, the subalphabets which will be considered will be only those which might form a prefix set in some alphabetical binary encoding of the whole alphabet. Since only those sets of letters consisting exactly of all those letters which lie between some pair of letters can serve as a prefix set, such a set will be called an allowable subalphabet.

The allowable subalphabet consisting of all of those letters which follows $L_i$ in the alphabet (including $L_i$ itself) and which precede $L_j$ (again including $L_j$ itself) will be denoted by ($L_i$, $L_j$). When referring to the ordinary English alphabet of Table I the symbol # will be used for the space symbol. Thus (#, B) will be the subalphabet containing the three symbols space, A, and B. (A, A) will be used to denote the subalphabet containing only the letter A.

If it were desired to find an optimum encoding satisfying certain other kinds of restrictions than the alphabetical one, different allowable subalphabets could be used, with the rest of the algorithm remaining analogous. This method of building up an encoding by combining encodings for subalphabets is analogous to the method used by Huffman, except that he is able to organize his algorithms such that no subalphabets are used except those which actually occur as prefix sets in his final encoding. In our method, however, all allowable subalphabets are considered, including some which are not actually used as part of the final encoding.

The term "cost of an encoding" has been used to refer to the average number of binary digits per letter of transmitted message; that is, $\Sigma_i p_i N_i$, where $p_i$ is the probability of the $i$th letter and $N_i$ is the number of binary digits in the $i$th letter. Since, in the algorithm to be described, we will be constructing an encoding for each allowable subalphabet, we will also use the corresponding sum for each subalphabet. But since the probabilities $p_i$ do not even add up to 1 for proper subalphabets, the sum $\Sigma_i p_i N_i$ does not correspond exactly to a cost of transmitting messages, and so the corresponding sum will be called a "partial cost."

The algorithm to be described takes place in $n$ stages, where $n$ is the number of letters in the alphabet. At the $k$th stage the best alphabetical binary encoding for each $k$-letter allowable subalphabet will be constructed and its partial cost will be computed. For $k=1$, each subalphabet of the form ($L_i$, $L_i$) will be encoded by the trivial encoding which encodes $L_i$ with the null sequence and which has cost 0 since the number of digits in the null sequence is 0. For $k=2$, each subalphabet of the form $(L_i, L_{i+1})$ will be encoded by letting the code for $L_i$ be 0 and the code for $L_{i+1}$ be 1. The partial cost of this encoding is $p_i+p_{i+1}$. In general, the $k$th stage of the algorithm, in which it is desired to find the best alphabetical binary encoding for each subalphabet of the form $(L_i, L_{i+k-1})$ and its partial cost, proceeds by making use of the codes and the partial costs computed in the previous stages. For each $j$ between $i+1$ and $i+k-1$, we can define a binary alphabetical encoding as follows. Let $C_i, C_{i+1}, \ldots C_{j-1}$ be the codes for $L_i, L_{i+1}, \ldots L_{j-1}$ given by the (previously constructed) best alphabetical encoding for $(L_i, L_{j-1})$, and let $C'_j, C'_{j+1}, \ldots C'_{i+k-1}$ be the codes for $L_j, L_{j+1}, \ldots, L_{i+k-1}$ given by the (previously constructed) best alphabetical encoding for $(L_j, L_{i+k-1})$. Then the new encoding for $L_i, L_{i+1}, \ldots, L_{j-1}, L_j, L_{j+1}, \ldots, L_{i+k-1}$ will be $0C_i, 0C_{i+1}, \ldots, 0C_{j-1}, 1C'_j, 1C'_{j+1}, \ldots, 1C'_{i+k-1}$. For each $j$ such an encoding can be defined, and the encoding is exhaustive. It follows from Theorem II that the best encoding for this subalphabet is given by one of the $k-1$ such encodings which can be obtained for the $k-1$ different values of $j$. The partial cost of such an encoding made up out of two subencodings is the sum of the partial costs of the two subencodings plus $p_i+p_{i+1}+ \ldots +p_{i+k-1}$. To per-all of these encodings, but only to compute enough to decide which one of the $k-1$ different encodings has the lowest partial cost. This is done by taking the sums of each of the $k-1$ pairs of partial costs of subencodings, and constructing the best encoding only.
form the algorithm it will not be necessary to construct After the $k$th stage of this algorithm has been completed for $k=1, 2, \ldots, n$, the final encoding obtained is the best alphabetical encoding for the entire original alphabet, and the final partial cost obtained is the cost of this best alphabetical encoding.

If the above algorithm were performed on a digital computer, the length of time required to do the calculation would be proportional to $n^3$. The innermost inductive loop of the computer program would perform the operation mentioned above of computing sums of pairs of partial costs, and would be done $k-1$ times in the process of encoding each one of the subalphabets considered in the $k$th stage. But since there are $(n-(k-1))$ different allowable subalphabets to be encoded in the $k$th stage, there are $(k-1)(n-(k-1))$ steps to be done in the $k$th stage. To find the total number of operations done in all of the stages, we sum, and find that $$\sum_{k=1}^{n} (k-1)(n-(k-1)) = (n^3-n)/6$$

which is an identity which can be verified by mathematical induction.

In the foregoing description, one specific alphabetized variable length encoding has been developed from the bare listing of the probabilities and ordering of the 26 letters and the space symbol. General techniques for constructing a best encoding of this type to represent any such list of characters have also been described. In addition, the systematic techniques for constructing logic circuits to convert from one specific standard length code to a particular variable length code have been set forth. A typical system for utilizing variable length alphabetized codes has also been described.

With this background, it is clear that ordered variable length encodings can be constructed to represent any list of items, or letters, having a predetermined probability of occurrence and a predetermined ordering. In addition, circuits may be constructed to implement and utilize the resultant encodings. As mentioned previously, these circuits will have the three important advantages of (1) a low cost in terms of digits per transmitted letter, (2) requiring no special synchronizing signals transmitted between the encoding and decoding circuits, and (3) utilizing standard numerical ordering techniques for alphabetical sorting purposes. With regard to the alphabetical sorting property, it is particularly interesting to note that words made up of groups of codes may be properly sorted, despite the variable lengths of the individual codes representing the letters of the words.

One minor additional advantage of the codes is a result of the linear distribution of letters in the numerical scale following encoding. Thus, for example, if a number of filing folders were identified by successive binary numbers, and words were filed in these folders in accordance with the numerical prefix of the words, approximately the same number of words would be filed in each folder. This property also leads to linear interpolation between coded entries representing a list of words.

Reference is made to W. O. Fleckenstein application Serial No. 759,013, filed September 4, 1958, concurrently with this application, which discloses the use of marker pulses at the terminals for facilitating the handling of variable length codes.

It is to be understood that the above-described arrangements are illustrative of the application of the principles of the invention. Numerous other arrangements may be devised by those skilled in the art without departing from the spirit and scope of the invention.

What is claimed is:

1. In a data processing system, input means for serially presenting fixed length binary codes representing individual alphabetical letters, means for translating said fixed length binary codes into variable length binary codes having the dual properties that the length of said variable length codes is generally inverse to the frequency of occurrence of said letters and that, starting from one end of said variable length codes, the numerical values of said codes are in the order of occurrence of said letters in the alphabet, and means responsive to the variable length binary codes from said translating means for sorting specified ones of said letters in accordance with the numerical values of said codes.

2. In a digital data handling system, means for supplying fixed length digital code groups representing characters having a predetermined ordering, means for translating said code groups into a set of different variable length digital code groups having a numerical ordering corresponding to said predetermined ordering, and means responsive to the variable length digital code groups from said translating means for sorting said code groups numerically in accordance with the successive digits of said code groups irrespective of the lengths of said code groups and starting with one end digit of each of said code groups.

3. In a data processing system, input means for serially presenting fixed length binary codes representing individual alphabetical letters, means for translating said fixed length binary codes into variable length binary codes having the dual properties that the length of said variable length codes is generally inverse to the frequency of occurrence of said letters and that, starting from one end of said variable length codes, the numerical values of said codes are in the order of occurrence of said letters in the alphabet, means for normalizing the variable length codes by identifying the most significant digit of the codes, and means for sorting specified ones of said letters by a comparison of the numerical values of said codes starting with the most significant digits of said codes.

4. In a data processing system, input means for serially presenting fixed length binary codes representing individual alphabetical letters, means for translating said fixed length binary codes into variable length binary codes having the dual properties that the length of said variable length codes is generally inverse to the frequency of occurrence of said letters and that, starting from one end of said variable length codes, the numerical values of said codes are in the order of occurrence of said letters in the alphabet, means for transmitting said codes with the most significant digit first, means for breaking the transmitted digital signals into words, storage means, means for normalizing said words by shifting the most significant digit of the code group representing the first letter of each word into a standard position in said storage means, and means for numerically comparing said normalized words.

References Cited in the file of this patent

UNITED STATES PATENTS

| | | |
|---|---|---|
| 2,360,296 | Willis | Oct. 10, 1944 |
| 2,367,042 | Neiswinter | Jan. 9, 1945 |
| 2,538,615 | Carbrey | Jan. 16, 1951 |
| 2,847,503 | Diamond | Aug. 12, 1958 |